H. E. HOUSE.
KALEIDOSCOPE.
APPLICATION FILED APR. 13, 1920.

1,398,858.

Patented Nov. 29, 1921.

Inventor
Herbert E. House
by Graham + Louis
Attorneys

UNITED STATES PATENT OFFICE.

HERBERT E. HOUSE, OF PASADENA, CALIFORNIA, ASSIGNOR TO CLARENCE S. POTTER AND WARREN T. POTTER, BOTH OF LOS ANGELES, CALIFORNIA, PARTNERS.

KALEIDOSCOPE.

1,398,858.  Specification of Letters Patent.  Patented Nov. 29, 1921.

Application filed April 13, 1920. Serial No. 373,556.

*To all whom it may concern:*

Be it known that I, HERBERT E. HOUSE, a citizen of the United States, residing at Pasadena, county of Los Angeles, and State of California, have invented a new and useful Kaleidoscope, of which the following is a specification.

My invention relates to kaleidoscopes.

The principal object of the invention is to provide a novel form of construction by which a perfect alinement of the mirrors as produced and by which the full effectiveness of the mirror is secured, this construction being at the same time low in first cost and providing a much stronger type of construction than ordinarily employed.

A still further object of my invention is to provide a novel form of shutter or door for closing the object chamber.

Referring to the drawings which are for illustrative purposes only,

Figure 1:
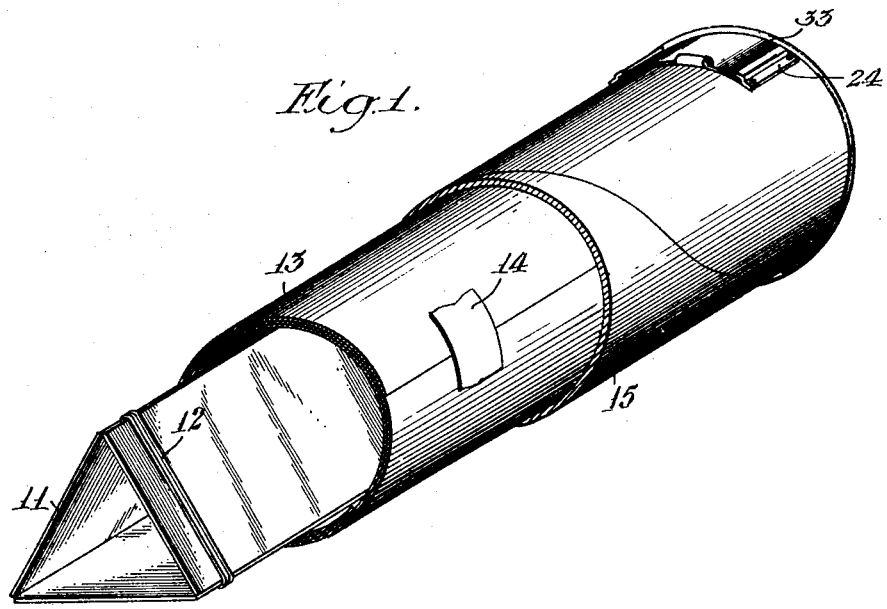
Figure 1 is a view of a kaleidoscope, portions thereof being broken away to show the internal structure.
Figure 2:
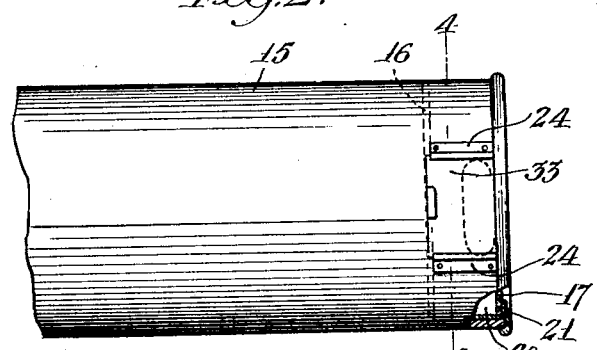
Fig. 2 is a view of the object chamber and Fig. 3 is an end view of some.
Figure 3:
Figure 4:
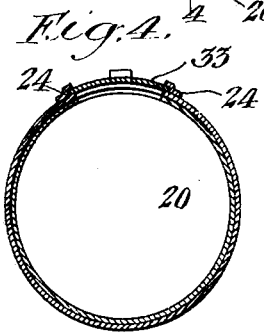
Fig. 4 is a section on a plane represented by the line 4—4 of Fig. 2.

In the form of my invention shown, three mirrors 11 are employed, these mirrors being temporarily bound together with cord members 12 and then being wrapped in a rough paper filler 13, this filler being secured by a strip of adhesive paper 14. The mirrors 11 inside the filler 13 are then slid in endwise into a pre-formed tube 15. This tube is provided with a partition shown in dotted lines at 16 and with an end glass 17, the space between the partition 16 and the glass 17 forming an object chamber 20. The glass 17 is held in place by metal ends 21 which are shaped as shown in Fig. 3, with cut-out portions opposite the corners of the mirrors to admit light to said corners, the mirrors 11 having the position shown in relation thereto. For the purpose of giving access to the object chamber 20, I provide an opening in the wall of the object chamber, this opening being closed by a door 33 sliding in a line parallel to the axis of the kaleidoscope and being held in place by cleats 24 secured to the tube 15. It is common practice at the present time to slide the mirrors 11 directly inside the tube 15. It is extremely difficult to properly assemble the parts in this manner and by using the filler 13, I am able to quickly assemble parts. The filler 13 is relatively inexpensive and also provides a spacer for spacing the intersecting corners of the mirrors 11 away from the tube 15 so that no image of the tube is shown at the intersections of the mirror surfaces.

It is highly important that the mirrors be retained permanently in position and that the joints at their corners be retained so that no light is admitted. To secure this result, the wrapping 13 is provided, and when wound tightly about the mirrors and secured in position in the form of a cylinder it has been found to reliably maintain the mirrors in position, the cylindrical form of the wrapping insuring firm contact therewith at each corner. The wrapping also permits a tight and reliable fit inside of the casing 15 by reason of the frictional engagement between the surfaces of the two cylinders and thereby insures permanent retention of the mirrors in correct position, so that no relative movement can take place between the mirrors and the end piece 21. This is quite important because any slipping of the mirrors would cause their corners to move away from correct position opposite the cut-out portions of the end piece, thus causing shadows which will interfere with the color effects as seen on the ground glass.

I claim as my invention:

In a kaleidoscope, the combination of: mirrors set to form an equilateral dihedral angle; a cylindrical paper tube wound to tightly inclose said mirrors; and a tube into which said tube with its included mirrors may be forced.

In testimony whereof, I have hereunto set my hand at Los Angeles, California, this 5th day of April, 1920.

HERBERT E. HOUSE.